Patented July 29, 1924.

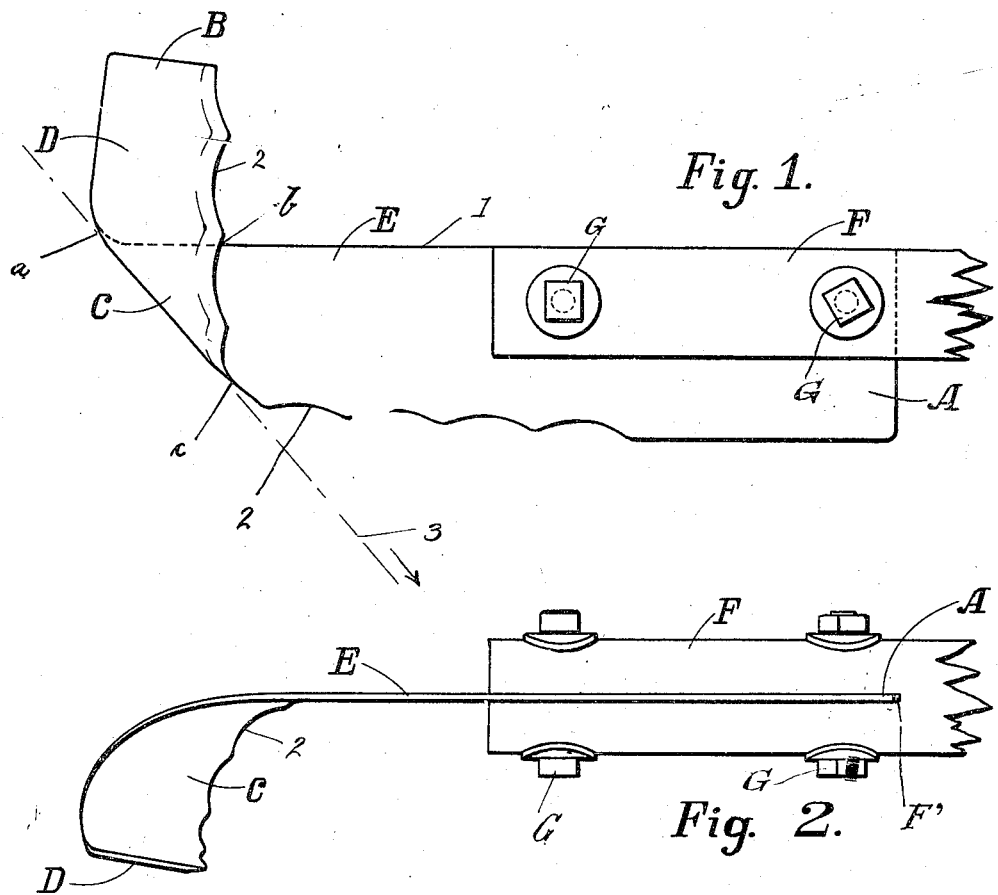

1,503,143

UNITED STATES PATENT OFFICE.

CHARLES A. UPTON, OF ST. PAUL, MINNESOTA.

LAWN EDGER.

Application filed October 2, 1920. Serial No. 414,264.

*To all whom it may concern:*

Be it known that I, CHARLES A. UPTON, a citizen of the United States, residing at St. Paul, in the county of Ramsey and State of Minnesota, have invented certain new and useful Improvements in Lawn Edgers, of which the following is a specification.

This invention relates to lawn trimming devices and more particularly to that type designed for channeling the edges adjacent the walk or for trimming the edges of flower beds and the like.

An object of the invention is to provide a device of the class described which may be operated with a minimum expenditure of energy, and at the same time be capable of cutting a deep clean channel of the usual form.

To this end my invention consists in certain novel features of construction shown in the accompanying drawings and hereinafter described and claimed.

Figure 1 is a side view of the invention the handle being shown partly broken away and Figure 2 is a top view of the same.

In the drawings, A represents the cutting blade and F the handle, the latter having a longitudinal slit or bifurcation F' to snugly receive the blade. A pair of bolts G suitably spaced and projected through the bifurcated portion of the handle and blade serve as one means to bind the handle and blade firmly together.

The blade, as shown, is formed of a strap of suitable steel having a straight back edge 1, and a serrated cutting edge 2, said edges converging toward the outer free end of the blade, so as to render it gradually somewhat stiffer in the direction of the handle. The blade is preferably made of thin sheet steel and is bent so as to form an L shaped cutter, the cutting edge 2 being serrated and ground on the outside so as to effect a smooth inner surface.

The short leg member B of the cutter blade stands approximately at right angles to the long leg member E thereof, so that when, in operation, the cutter is drawn through the soil in the direction of the ground line 3, the former will cut from below upwards and the latter from above downwards, thereby providing an oppositely directed shear to the cutting edges of said members. By making the blade L shaped, the member E makes the initial cut of one side of the channel in advance of the member B, in which the latter trails behind to make the cut for the opposite side of the channel. Thus the strip of soil being removed does not frictionally pass between two directly opposite walls (as is the case in some devices of this class) excepting in the bend C forming a small triangular area bounded by a *a—b* and *c* Figure 1. Thus the strip of soil is free to move laterally as it is cut by the trailing member B, it being given freedom to move sidewise by the cut made by the advance member E. This renders the device much easier to operate it requiring much less energy than those devices having channel cutters with directly oppositely disposed walls.

I claim:

A device of the class described comprising a handle, a flat blade extending endwise from said handle and in line therewith, the free end of said blade at some distance beyond the handle being bent substantially at right angles to extend across and beyond the blade, the inner edge of said bent portion and the continuing straight edge of the straight portion of the blade being formed with regular wave-like serrations to form a cutting edge for the bent portion and to form an opposed cutting edge for the straight portion between the bent portion and handle, the serrations of the bent portion being beveled inwardly toward the handle and the serrations of the straight portion beveled downwardly, and the latter serrations extending in one direction beneath the handle and in the opposite direction merging into the serrations of the bent portion in a transverse and upwardly inclined direction.

In testimony whereof I affix my signature.

CHARLES A. UPTON.